(12) United States Patent
Park

(10) Patent No.: US 11,341,112 B2
(45) Date of Patent: *May 24, 2022

(54) DATABASE LOCK MANAGEMENT WITH CACHE-OPTIMIZED HASH TABLE

(71) Applicant: SAP SE, Walldorf (DE)

(72) Inventor: Chang Gyoo Park, Seoul (KR)

(73) Assignee: SAP SE, Walldorf (DE)

( * ) Notice: Subject to any disclaimer, the term of this patent is extended or adjusted under 35 U.S.C. 154(b) by 99 days.

This patent is subject to a terminal disclaimer.

(21) Appl. No.: 16/918,057

(22) Filed: Jul. 1, 2020

(65) Prior Publication Data

US 2020/0334226 A1      Oct. 22, 2020

Related U.S. Application Data

(63) Continuation of application No. 15/944,447, filed on Apr. 3, 2018, now Pat. No. 10,733,171.

(51) Int. Cl.
  *G06F 16/23*       (2019.01)
  *G06F 16/22*       (2019.01)
  *G06F 16/2455*     (2019.01)

(52) U.S. Cl.
  CPC ...... *G06F 16/2343* (2019.01); *G06F 16/2255* (2019.01); *G06F 16/2272* (2019.01); *G06F 16/24552* (2019.01)

(58) Field of Classification Search
  CPC ............. G06F 16/2343; G06F 16/2255; G06F 16/2272; G06F 16/24552
  See application file for complete search history.

(56) References Cited

U.S. PATENT DOCUMENTS

| | | | |
|---|---|---|---|
| 5,197,139 A | 3/1993 | Emma et al. | |
| 5,408,653 A | 4/1995 | Josten et al. | |
| 5,832,484 A | 11/1998 | Sankaran et al. | |
| 7,069,268 B1 * | 6/2006 | Burns | H04L 45/00 707/770 |
| 10,733,171 B2 | 8/2020 | Park | |
| 2014/0181375 A1 | 6/2014 | Miyamoto et al. | |
| 2019/0303468 A1 | 10/2019 | Park | |

OTHER PUBLICATIONS

Extended European Search Report issued in European Application No. 19166457.2 dated Jul. 24, 2019, 11 pages.
Ren et al., "Lightweight Locking for Main Memory Database Systems" Proceedings of the VLDB Endowment, 6.2, Dec. 2012, 12 pages.

* cited by examiner

*Primary Examiner* — William Spieler
(74) *Attorney, Agent, or Firm* — Fish & Richardson P.C.

(57) ABSTRACT

Lock table management is provided for a lock manager of a database system, in which lock management is provided in a manner that is fast and efficient, and that conserves processing, memory, and other computational resources. For example, the lock table management can use a hashmap in which keys and values are stored in separate arrays, which can be loaded into separate CPU cache lines.

20 Claims, 12 Drawing Sheets

| Array Index | 128-bit Lock Key (32-bit type id, 96-bit key) | Data (total 48-byte) |
|---|---|---|
| 13 | (empty) | (empty) |
| 14 | Table, 0x1010 | Owners = {25524, 25520}, mode = IX, waiters = 0, waitQueue = nullptr |
| 15 | Table, 0x1040 | owners = {25510}, mode = X, waiters = 0, waitQueue = nullptr |
| 16 | Record, 0x10100010 | owners = {25520}, mode = X, waiters = 0, waitQueue = nullptr |
| 17 | (empty) | (empty) |
| 18 | Record, 0x10100018 | owners = {25524}, mode = X, waiters = 0, waitQueue = nullptr |

FIG. 2

| Array Index | 128-bit Lock Key (32-bit type id, 96-bit key) | Data (total 48-byte) |
|---|---|---|
| 13 | (empty) | (empty) |
| 14 | Table, 0x1010 | Owners = {25524, 25520}, mode = IX, waiters = 0, waitQueue = nullptr |
| 15 | empty ← 702 | empty ← 704 |
| 16 | Record, 0x10100010 | owners = {25520}, mode = X, waiters = 0, waitQueue = nullptr |
| 17 | (empty) | (empty) |
| 18 | Record, 0x10100018 | owners = {25524}, mode = X, waiters = 0, waitQueue = nullptr |

FIG. 7

| Array Index | 128-bit Lock Key (32-bit type id, 96-bit key) | Data (total 48-byte) |
|---|---|---|
| 13 | (empty) | (empty) |
| 14 | Table, 0x1010 | Owners = {25524, 25520}, mode = IX, waiters = 0, waitQueue = nullptr |
| 15 | Table, 0x1040 | Owners = {}, mode = NONE, waiters = 0, waitQueue = nullptr |
| 16 | Record, 0x10100010 | owners = {25520}, mode = X, waiters = 0, waitQueue = nullptr |
| 17 | (empty) | (empty) |
| 18 | Record, 0x10100018 | owners = {25524}, mode = X, waiters = 0, waitQueue = nullptr |

DATABASE LOCK MANAGEMENT WITH CACHE-OPTIMIZED HASH TABLE

CLAIM OF PRIORITY

This application claims priority under 35 USC § 120 to U.S. patent application Ser. No. 15/944,447, filed on Apr. 3, 2018, the entire contents of which are hereby incorporated by reference.

TECHNICAL FIELD

This description relates to lock management for database tables.

BACKGROUND

Databases are generally used to store large quantities of information, in an organized manner that enables fast and convenient searching and other database operations. Often, such large databases are accessed by multiple entities (e.g., users, or clients) during overlapping time frames. In order to maintain data consistency, lock management techniques are used to ensure that a given data entry may only be changed by one such entity at a time.

For example, lock management techniques may utilize a lock table that stores an entry for each locked database element (e.g., for a particular database table, or data record), along with a relevant lock value(s) (e.g., an owner, a transaction identifier, and/or a lock type). Each entry of such a lock table may be assigned through the use of a hashing algorithm. For example, when a lock is required by a database client/user for a particular database table, a hash value for the database table to be locked may be calculated. Then, a corresponding entry in the lock table may be generated and stored, including associated lock value(s).

Many such lock tables typically provide suitable results in terms of maintaining data consistency. However, lock tables have various types of overhead, as well. For example, creating and maintaining lock tables utilizes both memory and processing resources. Further, current and future databases provide extremely fast data access times. In many cases, the time needed to implement lock management operations is undesirably long compared to the corresponding database operations being implemented. As a result, the lock management operations may cause a bottleneck in the speed of a database transaction as a whole.

BRIEF DESCRIPTION OF THE DRAWINGS

FIG. 2 is a table portion illustrating a portion of the lock table of FIG. 1.

FIG. 7 is a table portion illustrating a portion of the lock table of FIG. 1, in conjunction with an erase operation of FIG. 6.

FIG. 8 is a table portion illustrating a portion of the lock table of FIG. 1, in conjunction with an emplace/insert operation of FIG. 6.

DETAILED DESCRIPTION

Figure 1:
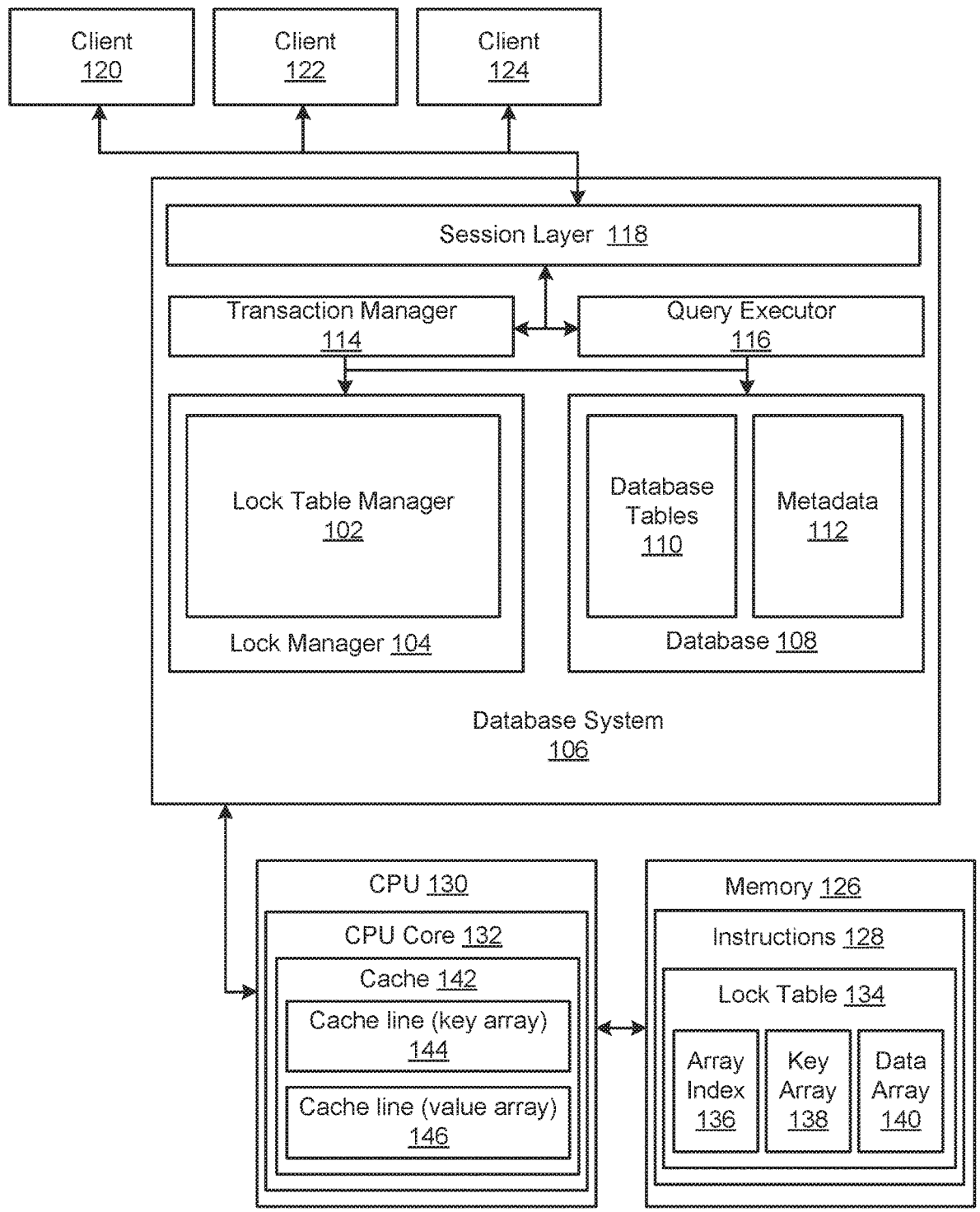
FIG. 1 is a block diagram of a system 100 for database lock management.

FIG. 1 is a block diagram of a system 100 for database lock management. In the example of FIG. 1, a lock table manager 102 is included within a lock manager 104 of a database system 106. As described herein, the lock table manager 102 is configured to provide lock management in a manner that is fast and efficient, and that conserves processing, memory, and other computational resources.

In FIG. 1, the database system 106 includes a database 108, which includes a plurality of database tables 110 and associated metadata 112. Further with respect to the database system 106, a transaction manager 114 may be configured to coordinate database transactions with respect to the database 108. For example, the transaction manager 114 may be configured to track running and closed transactions, including specific transaction events, such as transaction commits or rollback operations. The transaction manager 114 may also be configured to inform the database 108 with respect to such transaction events, so that the database 108 may execute any associated actions. Similarly, the transaction manager 114 may be configured to interact with the lock manager 104, and provide the lock manager 104 with any transaction-related data that may be necessary for the lock manager 104 to execute associated lock management operations.

A query executor 116 may be configured to execute specific queries against the database 108. As shown, the query executor 116 may be configured to operate in accordance with lock management operations of the lock manager 104. A session layer 118 is configured to receive one or more queries from one or more clients of the database system 106, represented in the example of FIG. 1 by a plurality of clients 120, 122, and 124.

Thus, the system 100 generally represents and illustrates simplified scenarios in which the various clients 120, 122, and 124 are configured to issue a plurality of queries and associated database commands to a single/same instance of the database system 106. The various queries and commands are received at the session layer 118, which may proceed to compile or otherwise prepare the various received queries and commands for use by the transaction manager 114 and the query executor 116. As already referenced, and as described in more detail, below, the transaction manager 114 and the query executor 116 may thus be configured to access the database 108, and ultimately provide the requested or desired results for each of the clients 120, 122, and 124.

In particular, as already referenced above, it may occur that the various clients 120, 122, and 124 submit a plurality of queries or other database commands that are received at the session layer 118 and that require at least one common database element of the database tables 110 (e.g., a particular database table, or table record). These queries or other commands may be received in temporal proximity to one another, and/or may have overlapping response times with respect to obtaining desired results.

For example, in a simplified example, the client 120 may request access to a particular table of the database tables 110, in order to execute a query or other database command having a first response time. At approximately the same time, the client 122 may also submit a query or database command that requires the same database table of the database tables 110, and that is associated with a second response time. In order to maintain database consistency with respect to the requested database table, the lock manager 104 is configured to restrict access to the requested database table 110, so that the clients 120, 122 are provided with separate, sequential access to the requested table.

Although many conventional lock management techniques may succeed in utilizing various approaches to maintaining data consistency in the above and similar scenarios, the lock table manager 102 of the lock manager 104 of FIG. 1 is configured to provide such data consistency in a manner that reduces resource consumption within the system 100, while also reducing overall data access times experienced by the various clients 120, 122, and 124.

In particular, the system 100 may include one or more computer memories, represented by a non-transitory computer readable memory 126 in FIG. 1. As shown, the memory 126 may include a plurality of executable instructions 128, which may be executed by one or more processors, represented in FIG. 1 by a CPU 130, to thereby provide the database system 106.

It will be appreciated that the memory 126 and the CPU 130 are intended to represent simplified, non-limiting examples, and that many additional or alternative implementations are represented by the simplified example of FIG. 1. For example, as just referenced, the memory 126 may represent different types of computer memory, such as a main memory and/or disk storage. Similarly, the CPU 130 may represent two or more CPUs operating in parallel, and, as shown, each such CPU may include a CPU core 132, which may itself represent two or more cores executing in parallel.

Similarly, the database system 106 should be understood to represent many different types of database systems, and such database systems may include many different features and functions that are known in the art, and that are therefore not described herein in further detail, except as may be necessary or helpful in understanding operations of the system 100, including operations of the lock table manager 102. In particular, features and functions of the database 108, the transaction manager 114, the query executor 116, and the session layer 118 are only described to the extent necessary to be helpful in understanding related operations of the lock manager 104. Nonetheless, for the sake of providing more specific examples, various implementations below may be described with respect to in-memory or main memory database systems, such as the HANA and/or VORA in-memory database systems of SAPSE of Waldorf, Germany.

In such database systems, for example, the database tables 110 may be stored using an available main memory (e.g., random access memory (RAM)). In such systems, data access may be provided with extremely high speeds and extremely low latencies, even when very large quantities of data are stored within the database tables 110. In such systems in particular, the lock table manager 102 may be advantageous in providing a lock table 134 and associated access and management techniques, so that operations of the lock manager 104 have minimal impact with respect to database access times/latencies, while also conserving hardware resources represented, e.g., by the memory 126 and the CPU 130.

In this regard, as just referenced with respect to the system 100 as a whole, it will be appreciated that the lock manager 104 may itself include a number of known features and functions that would be understood and appreciated by one of skill in the art. For example, the lock manager 104 may include functionalities for detecting and resolving deadlock conditions, in which a data element of the database tables 110 is simultaneously locked by multiple clients of the clients 120, 122, and 124. Such features and functions are only described herein to the extent necessary or helpful in understanding operations of the lock table manager 102 in constructing, managing, and otherwise utilizing the lock table 134.

For example, the lock manager 104, including the lock table manager 102, may utilize one or more known or future hashing algorithms to construct and access the lock table 134. As is known, such hashing algorithms generally provide a mapping between two values, in which the mapping is ideally unique. In practice, the mapping is often not completely unique, in which case, for example, two or more of a first set of values will be mapped to a single/same value of a second set of values. Such non-ideal, non-unique mappings are often referred to as hashing collisions, or just collisions.

Notwithstanding the above, such hashing algorithms are known to provide a number of advantages with respect to constructing and utilizing data tables. For example, simply providing a first value to the relevant hashing algorithm typically provides fast, direct knowledge of a storage location of the hashed value within a corresponding table of data. In this way, for example, it is possible to avoid, reduce, or minimize a need for scanning through large sections of database tables to locate desired data. Thus, database management is simplified and fast, even when considering the associated need to develop and implement collision resolution techniques.

In the context of database lock management, such as is described herein, a particular database element to be locked (e.g., a specific database table, or a specific record of a database table), or some aspect thereof, may be utilized as a key submitted to a hashing algorithm. In this way, corresponding lock data may be positioned and stored within the lock table 134 in a manner that is fast and straightforward to determine.

For example, in a simplified example, it may occur that the client 120 requests a lock with respect to a particular database table of the database tables 110. The lock table manager 102 may proceed to utilize the requested database table and a designated hashing algorithm to store a corresponding lock within the lock table 134. That is, as described in detail below, e.g., with respect to FIG. 2, the results of the hashing algorithm specify a location within the lock table 134 at which the locked data table will be identified, in conjunction with relevant lock data (e.g., such as an identification of the client 120 requesting the lock, and/or an identification of a specific transaction received from the client 120 and associated with the requested lock).

In more detail, as illustrated, the lock table 134 includes an array index 136, which represents a plurality of index values within the lock table 134, each index value corresponding to at least one available or potential database lock for a corresponding database element (e.g., table, or record). That is, as described, a specific database element to be locked may be assigned to a specific, corresponding index value of the array index 136, through the use of the designated hashing algorithm.

Further in FIG. 1, a key array 138 of the lock table 134 represents an array of specified database elements to be locked, each database element specified with respect to a corresponding index value of the array index 136. For example, a first database table may be utilized to determine a key that is hashed to an index value of n=1 within the array index 136. In the example, the key array 138 will include the lock key for the first database table (and associated lock key metadata, as described herein), stored within the lock table 134 in conjunction with the corresponding index value. Similarly, of course, a second database element to be locked may be provided to the same hashing algorithm, to thereby determine an index value of n=2. In this way, again, the resulting key value (and associated key metadata values) may be stored in the key array 138 in conjunction with the corresponding index value of the index array 136.

For each calculated key and associated key metadata of the key array 138, a corresponding lock data entry may be stored within a data array 140, which stores corresponding lock data values. For example, as described herein, e.g., with respect to FIG. 2, the lock data may include an identification of an owner of the lock, a relevant transaction, a type of the lock (e.g., shared or exclusive), and/or a queue of clients/transactions waiting to acquire a lock on the relevant database element.

In FIG. 1, the contents of the key array 138 are stored in a different column than contents of the data array 140, so that the key array 138 (or portions thereof) may be loaded from the memory 126 separately from corresponding values of the data array 140. In other words, for example, an index value of the array index 136 may be associated with a corresponding element of the key array 138, as well as with a corresponding element of the data array 140.

Thus, a particular key of the key array 138 and corresponding data of the data array 140 are not required to be stored together within a range of memory addresses of the memory 126, e.g., as a single memory "chunk." Instead, for example, the lock table 134 may be constructed using column store techniques, in which keys of the key array 138 are stored in a column corresponding to a sequential set of memory addresses, while values of the data array 140 are stored using a separate column in a corresponding, separate sequence of memory addresses. As described, each key/data pair will have the same index value "n."

In order to leverage the above (and other) features and aspects of the structure of the lock table 134, to thereby provide fast and efficient access to contents of the lock table 134, the CPU core 132 may be instructed by the lock table manager 102 to load specified portions of the key array 138 to a cache 142 of the CPU core 132, such that the loaded portion of the key array 138 is loaded within a cache line 144 of the cache 142. Further, if requested, the lock table manager 102 may be configured to cause the CPU core 132 to load corresponding values of the data array 140 to a second, separate cache line 146 of the cache 142.

In other words, for example, for a given index value, or range of index values, one or more corresponding key values of the key array 138 may be loaded to the cache line 144, while corresponding values of the data array 140 are separately loaded to the second cache line 146. As a result, for example, it is possible to load only the desired values of the key array 138 within the cache line 144, without being required to load corresponding values of the data array 140 within the cache line 146, at all (i.e., unless also required or desired).

A number of advantages may be achieved through the use of these and related features and aspects of the lock table 134. For example, in some scenarios, the lock manager 104 may require only specific key values of the key array 138, without also requiring values corresponding thereto from the data array 140. In such scenarios, resources are conserved, because the CPU core is not required to load the unneeded values of the data array 140 to the cache 142, and may instead load only the require values of the key array 138 to the cache line 144.

Further, as described in detail below, loading continuous or sequential key values from the key array 138 facilitates the inclusion of multiple key values corresponding to multiple index values of the index array 136. Having such access to multiple key values of multiple index values may be advantageous, for example, such as when hash collision resolution techniques (e.g., Hopscotch hashing, as described below, or other known or future techniques, such as "robin hood" hashing) cause key values to be stored at a different-than-expected index value. The techniques described above with respect to FIG. 1, in conjunction with various additional techniques described below, generally increase a probability that a desired key value will be loaded to the cache line 144, even when such hash collision resolution techniques have been utilized.

FIG. 2 is a table portion illustrating a portion of the lock table 134 of FIG. 1. As shown, FIG. 2 illustrates example values for the array index 136, the key array 138, and the data array 140. Specifically, the array index 136 has a value of n=13 for a row 202, n=14 for a row 204, n=15 for a row 206, n=16 for a row 208, n=17 for a row 210, and n=18 for a row 212. In other words, for example, FIG. 2 should be understood to represent an example scenario in which the lock table 134 includes at least the index values of n=0-18, where FIG. 2 illustrates only the range n=13-18.

In FIG. 2, the key array 138 is illustrated as including a 128-bit lock key for each database element (e.g., table, or record) that is associated with a lock request and hashed for storage at a corresponding index value within the lock table 134. For example, as shown, the index value n=13 for the row 202 is not currently assigned to, or associated with, any database element or associated lock request (and thus illustrated as 'empty'). On the other hand, in the row 204, the index value n=14 has been associated with a lock request for a specific database table, indicated in FIG. 2 as table 0x1010. Thus, the row 204 includes an entry 214 that includes 128-bit lock key (including a 32-bit type identifier and a 96-bit key, as described in detail below), which represents the table 0x1010.

Further in FIG. 2, the data array 140 is illustrated as including 48-byte entries for corresponding, locked database elements that are identified by matching index values. For example, continuing the example of the row 204, a corresponding element within the data array 140 includes identifiers 216 for lock owners, a selected lock mode 218, and weight/queue information related to subsequent locks to be enforced following the conclusion of a current lock. For example, the owners 216 may be understood to include transaction identifiers 25524 and 25520, corresponding to database transactions that require a lock on the corresponding table of the entry 214, table 0x1010.

It will be appreciated that FIG. 2 is merely a simplified example that is included for the sake of explanation, and, as such, is used in the context of various example implementations described below. Of course, a size, content, or other characteristics of each lock key and data value may vary, along with variations in the types of hashing algorithms and associated hashing techniques that may be utilized as a matter of design choice.

Returning to FIG. 1, and considering the example of FIG. 2, the following description provides example control flows that may be used in the system 100. For example, the client 120 may issue an SQL statement to insert a value (0) into a specified table "T." Accordingly, the client 120 may send the SQL statement to a database instance represented by the database system 106 of FIG. 1, whereupon the session layer 118 may proceed to interpret or compile the SQL statement. For example, the session layer 118 may, as referenced above, provide a detailed plan for execution of the SQL statement, including a list of table locks to be acquired, parallelization strategies for the SQL statement, and ordering of various sub-operations.

The query executor 116 may proceed to request a table lock for the specified table T in a requested lock mode, such as IX (intention exclusive) mode. For example, the query executor 116 may interact with a lock manager API of the lock manager 104 to acquire a requested table lock, including providing a lock key for the table, in a statement such as "lock manager::acquire Table Lock (Lock Key) table, 0x1010))," where it may be observed that the referenced table corresponds to the table of the entry 214 within the row 204 having index value n=14 in FIG. 2.

In the following description, the term "emplace" refers to a search and insert database operation. Further, the term "cursor" refers to a data structure used to manipulate data values and other entries of the lock table 134, as also described in detail below. In general, the cursor refers to a data structure that has ownership on an entry, and through which a corresponding value may be retrieved. For example, a cursor that points to index n=15 may be implemented with pointers that point to the corresponding entry of each of the key array 138 and the data array 140, and a command "Cursor::getValue( )" may return a pointer that points to Lock Data Array+15. An empty cursor is a cursor that does not point to any entry in an instance of the lock table 134. In another example, a reserved cursor is a cursor that points to an entry with the entry locked without pointing to a value.

Thus, in the example scenario being described, the received SQL statement may include an emplace command to search and return an existing entry with the specified key (e.g., the table 0x1010) in the case that the existing entry exists, or to create and insert a new, corresponding key if no such entry/key currently exists. As referenced above, and described in detail below, the lock table manager 102 and the associated lock table 134 enable fast, highly optimized internal searching of the lock table 134, in a manner that utilizes the cache 142 very effectively.

In the example being described, it is assumed that the entry exists, and a cursor data structure may be utilized to modify values thereof in a desired manner. For example, the obtained cursor data structure may be used to modify the value of the transaction ID included within the entry value 216 of the row 204 of FIG. 2. Specifically, the command "cursor. getValue( ). acquireIXLOCK(25524)://transaction_ID=25524" may be utilized to insert the value 25524 into the owner's field, as illustrated with respect to the entry portion 216, just referenced.

In the example, once the table lock is acquired, a corresponding record lock corresponding to a specific record of the table that may be needed for the received SQL statement to be executed may be specified. For example, the query executor 116 may proceed to acquire a record lock on the specified record of table T in a desired mode, e.g., in X (exclusive) mode. For example, the query executor 116 may proceed to call a corresponding lock manager API of the lock manager 104, such as LockManager::acquireRecordLock(LockKey(Record, 0x10100000)). A corresponding cursor command may be issued to execute the requested emplace operation, such as Cursor cursor=LockTableManager::emplace(LockKey(Record, 0x10100000)); cursor.getValue( ).acquireXLock(25524).

Following successful completion of the requested database operation, a control flow to execute a transaction commit may be executed. For example, the client 120 may send a commit command to the database instance of the database system 106, and the session layer 118 may again interpret or compile the received command. In this case, the received command is a transaction control command, and not an SQL statement. Accordingly, the transaction manager 114 may proceed to commit the previously-started transaction.

For example, once all necessary operations for the transaction commit have been performed, including, for example, commit-logging, the transaction manager may initiate a resource releasing phase in which locked database elements are released. For example, the transaction manager 114 may call a lock manager API of the lock manager 104 to execute an unlock operation. For example, continuing the above example, the unlock command LockManager::unlock (({LockKey(Table, 0x1010), LockKey(Record, 0x10100000)}) may be called. For each lock key of the unlock command, the following cursor operation may be executed to unlock the specific transaction using the associated transaction ID, such as {Cursor cursor=LockTableManager::search(lock_key); cursor-.getValue( ).unlock(25524);}

In order to unlock the specified database elements, and similarly to the corresponding lock request provided earlier, the lock table manager 102 and the lock table 134 are configured to execute necessary searches for the required keys and data to be locked/unlocked, in a fast and highly efficient manner.

Figure 3:
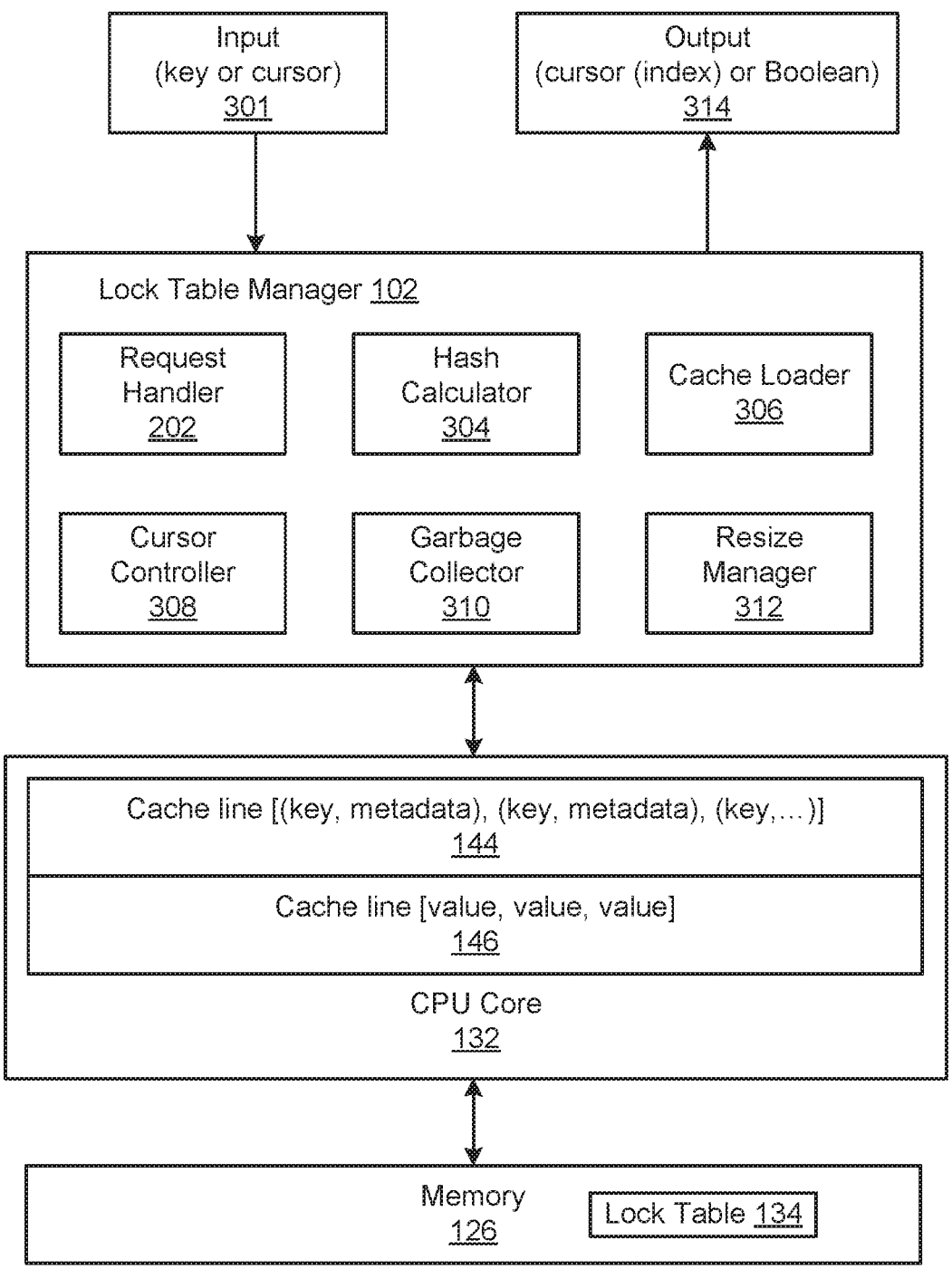
FIG. 3 is a block diagram illustrating a more detailed example implementation of the lock table manager of FIG. 1.

FIG. 3 is a block diagram illustrating more detailed example implementations of the lock table manager 102. In the example of FIG. 3, an input 301 is received at a request handler 302 of the lock table manager 102. Of course, it will be appreciated from the above descriptions of FIGS. 1 and 2 that the input 301 may be received in the context of the larger system 100 of FIG. 1. For example, the input 301 may be received via the transaction manager 114, or the query executor 116, via the lock manager 104.

As described herein, the input 301 may include any database element and corresponding key that may be stored within the lock table 134, such as a database table, or a specific table record. As referenced above with the example just provided in the context of FIGS. 1 and 2, the input 301 may also include a specific cursor that is used to modify an already-identified key, or associated value thereof.

Upon receipt of the input 301, the request handler 302 may determine a need to calculate a hash value of the received input 301. For example, a hash calculator 304 may be called to calculate the hash value of the input 301. The resulting hash value may be used, for example, to determine a corresponding index value for a specified database element within the lock table 134. For example, the hash calculator 304 may receive a request with respect to the table 0x1010, proceed to obtain a hash value corresponding thereto, and thereby determine that the table 0x1010 should be assigned to the index having the index value n=14 within the row 204 of FIG. 2. Further example operations of the request handler 302 and the hash calculator 304 with respect to populating values of the lock table 134 are provided, below.

A cache loader 306 may be configured to identify and load required portions of the lock table 134 from the memory 126 to corresponding cache lines 144, 146 of the CPU core 132, as shown. For example, as described in detail below with respect to FIG. 5, the cache loader 306 may be configured to identify a specific memory address within the memory 126 of at least a portion of the key array 138 that should be loaded to the cache line 144.

In particular, as described, the key array 138, being stored as a column array, may be separately loaded to the cache line 144. As a result, multiple keys may be fit into a single cache line, such as the cache line 144, even when associated key metadata is included.

This approach is useful and advantageous for a number of reasons. For example, in some implementations, the input 301 does not require values from the data array 140 at all, so that processing and memory resources are conserved by loading only the required key values necessary to satisfy the input 301. Similarly, in other scenarios, even when a particular value of the data array 140 is required, the described implementations enable fast and accurate location thereof within the lock table 134, again minimizing resources required to locate and load desired data values.

Still further, in some scenarios, the hash calculator 304 may experience the type of hashing collision referenced herein, such as when a particular database element happens to be hashed to an index value of the array index 136 that is already populated with an existing key. In such scenarios, the hashing collision may be resolved by moving the currently-hashed database element to a nearby index entry. As may be appreciated from the present description, loading multiple keys (e.g., adjacent keys) from within the key array 138 thus increases the odds that a required entry will be retrieved in the context of an initial cache request. Put another way, the lock table manager 102 and the lock table 134 reduce the chances that a cache miss will be experienced. As a result, fast and efficient lock operations may be provided.

In the example of FIG. 3, the cache line 144 corresponding to the loaded portion of the key array 138 is illustrated as including a plurality of (key, metadata) entries. In other words, as referenced above and described in detail below, each hashed key is associated with corresponding key metadata that is included within the corresponding index value entry of the key array 138, and that provides a number of functions with respect to the locking operations described herein.

For example, the key metadata may include information needed to resolve the types of hashing collisions just referenced, various status flags indicating the current status of the relevant key, and the hash value calculated by the hash calculator 304 for the corresponding key. Meanwhile, the cache line 146 illustrates that the corresponding values of the data array 140 may, if needed, be loaded to the CPU core 132, as well. For example, if a portion of the key array 138 is loaded that includes at least some of each of the entries corresponding to the index values n=13, 14, 15, then the corresponding entries of the key array 138 would be loaded to the cache line 144, while the corresponding values within the data array 140 would be loaded to the cache line 146.

Further in FIG. 3, a cursor controller 308 may be configured to provide the type of data structure described herein and used to modify entries or values specified by the input 301. For example, if a specific entry is identified in response to a search of the lock table 134, such as the entry of the row 204 having an index value n=14 in FIG. 2, then the cursor controller 308 may be utilized in any suitable manner with respect thereto. For example, the cursor controller 308 may be utilized to erase the entry entirely. In other scenarios, the cursor may be utilized to change or erase specific values within the specific entry. For example, in the latter scenario, the cursor may be utilized to remove the transaction ID "25524" from within the entry portion 216 of the data array 140 and the row 204, when the corresponding lock is released.

In this regard, it will be appreciated that a database element that is requested to be locked with respect to a particular transaction at a particular point in time may be more likely to require a subsequent lock in the relatively near future, as compared to another database element that has not recently been locked. Consequently, the lock table manager 102 and the lock table 134 may be further optimized by allowing a given database element and associated key to reside at a particular array index over the course of a plurality of transactions and associated lock/unlock operations.

For example, in the example of FIG. 2, it may occur that the table 0x1040 at the row 206 having the index value n=15 is locked with respect to a transaction having transaction ID 25510, as shown in the data values of an entry 224 of FIG. 2. Once this transaction has been completed and committed, a corresponding lock on the table 0x1040 may be released. Nonetheless, the corresponding key for the table 0x1040 may continue to reside within an entry 222 at the index value n=15, because it is relatively likely that a subsequent transaction may require a lock on the same table. It is more efficient to erase and repopulate merely the data values within the "owner's" field of the entry 224, as compared to erasing the entry at the index value n=15 in its entirety.

Notwithstanding the above, it may occur over time that a particular database element does not, in fact, require lock operations that recur with at least a threshold frequency. In other words, for example, it may occur that the "owners" field of the entry 224 specifying a lock transaction for the table 0x1040 remains empty over a period of time, and/or a number of transactions. In these and similar scenarios, a garbage collector 310 may be configured to erase or otherwise manage unused lock table entries, such as lock table entries in which the "owners" field is blank. For example, the garbage collector 310 may be implemented as a background thread that does not interact with operations of the clients 120, 122, 124. For example, the garbage collector 310 may determine, for each lock entry within the lock table 134, whether the lock entry is unused at a given point in time (e.g., periodically). If so, the garbage collector 310 may proceed to erase the lock entry.

As the garbage collector 310 operates over time, it may occur that the garbage collector 310 erases more and more entries of the lock table 134. As a result, the erased entries will be emptied, such as illustrated in FIG. 2 with respect to the row 202 having index value n=13, and with respect to the row 210 having index value n=17.

Conversely, it may also occur that a relatively large number of lock operations are requested and implemented at a particular point in time. In such cases, more and more of the rows of the lock table 134 will be populated with entries. Consequently, the lock table manager 102 also includes a resize manager 312. As described in detail herein, e.g., with respect to FIGS. 9-11, the resize manager 312 may be configured to determine when the lock table 134 is sparse (e.g., has a relatively large number of empty entries, such as the rows 202, 210), or when the lock table 134 is particularly full (e.g., has a relatively small number of empty entries). In the former case, in which the lock table 134 is relatively sparse, the resize manager 312 may be configured to reduce an overall size of the lock table 134. On the other hand, in the latter scenario, in which the lock table 134 is relatively full, the resize manager 312 may be configured to increase an overall size of the lock table 134. In particular, as described in detail below with respect to FIGS. 9-11, the resize manager 312 is configured to execute such resizing operations in a manner which minimizes any associated blocking of other operations of the lock manager 104, or of the database system 106, as a whole.

Finally in FIG. 3, the lock table manager 102 is also illustrated as providing a corresponding output 314 for the input 301. It will be appreciated that the type or nature of the output 314 will correspond to the type or nature of the input 301. For example, the output 314 may include a cursor providing a requested index value. In other example scenarios, the output 314 may include a Boolean expression (e.g., true or false) indicating a status corresponding to the requested input.

Figure 4:
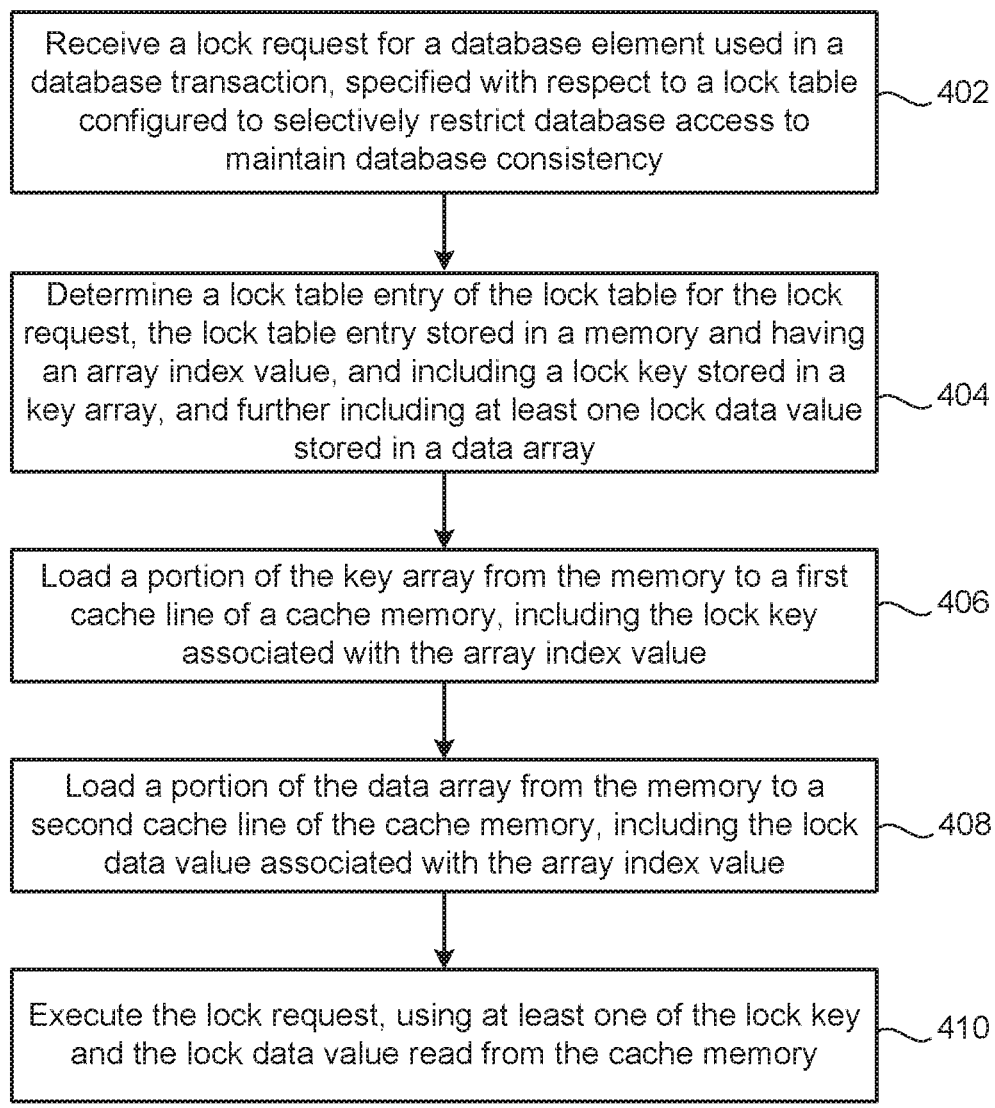
FIG. 4 is a flowchart illustrating example implementations of the system of FIG. 1.

FIG. 4 is a flowchart illustrating example implementations of the system 100 of FIG. 1, using the lock table manager 102 of FIG. 3. In the example of FIG. 4, operations 402-410 are illustrated as separate, sequential operations. However, it will be appreciated that various additional or alternative operations or sub-operations may be included, and/or one or more operation or sub-operation may be omitted. Further, any two or more such operations or sub-operations may be implemented in a partially or completely overlapping or parallel manner, or in a nested, iterative, looped, or branched fashion.

In the example of FIG. 4, a lock request for a database element used in a database transaction may be received, specified with respect to a lock table configured to selectively restrict database access to maintain database consistency (402). For example, the request handler 302 of the lock table manager 102 may receive one of a number of different types of lock requests for one or more types of database elements of the database 108. As described above, the lock manager 104 may be configured to utilize the lock table manager 102 and the lock table 134 to maintain database consistency for the database 108, including the database tables 110 and associated metadata 112, so that the representative clients 120, 122, and 124 are restricted from making database changes that would result in database inconsistencies. In general, as referenced herein, various types of lock requests may include searches, insertions, deletions, erasures, emplace operations, and any other type of database access request that may be received from one or more of the clients 120, 122, and 124. Accordingly, the one or more database elements for which the lock request may be received should be understood to represent any specified portion of the database 108 that may correspond to the received lock request. For example, the database element may include a table, a record within a table, a range of records within one or more tables, or any other identifiable portion of the database tables 110 and the metadata 112. The lock request may specify a particular transaction(s), a type of lock, and any other lock-relevant information.

A lock table entry of the lock table may be determined for the lock request, the lock table entry stored in a memory and having an array index value, and including a lock key stored in a key array, and further including at least one lock data value stored in a data array (404). For example, the request handler 302 may utilize the hash calculator 304 to determine such a lock table entry of the lock table 134. As described above with respect to FIG. 1, the referenced lock table entry may include a specific lock table entry associated with an array index value of the array index 136 of FIG. 1, so that the array index value of the lock table entry is associated with a corresponding lock key stored within the key array 138, as well as being associated with a corresponding lock data value stored within the data array 140. Or, with reference to FIG. 2, the lock table entry may correspond to any of the rows 202-212. For example, the row 204 is associated with the array index value n=14, the lock key corresponding to the entry 214 within the key array 138, and the plurality of various lock data values 216, 218, 220 described above and stored within the data array 140.

A portion of the key array may be loaded from the memory to a first cache line of a cache memory, including the lock key associated with the array index value (406). For example, the cache loader 306 may be configured to load at least the entry 214 into the cache line 144 from the memory 126. As described and illustrated with respect to FIG. 3, the cache loader 306 may be configured to load two or more adjacent lock keys to the cache line 144, such as when loading contiguous entries 214, 222. As described, loading contiguous entries in this manner is enabled at least in part by the ability to load portions of the key array 138 separately from loading of corresponding portions of the data array 140, so that the cache line 144 has more available room to hold more than one lock key.

As also described, it is possible that a desired lock key is not actually stored within an expected array index value originally calculated by the hash calculator 304, due to implementation of hash collision avoidance/resolution techniques. In some such cases, such as those described herein with respect to Hopscotch hashing resolution techniques, it may be likely that the desired lock key is stored within a nearby (e.g., adjacent) lock key entry of the lock key array 138. For example, as in various examples described below, a lock key expected to be stored within the entry 214 of the index value n=14 may actually be found within the entry 222 of the index value n=15.

A portion of the data array may be loaded from the memory to a second cache line of the cache memory, including the lock data value associated with the array index value (408). For example, the cache loader 306 may be configured to load the corresponding portion of the data array 140 from the memory 126 to the cache line 146. As illustrated in FIG. 3, and similarly to the cache line 144, the cache line 146 may thus hold a plurality of contiguous lock data values loaded from the lock data array 140. For example, continuing the example from the preceding paragraph, the cache line 146 may include entries from the data array 140 corresponding to both the row 204 having index value n=14 and the row 206 having index value n=15.

The lock request may be executed, using at least one of the lock key and the lock data value read from the cache memory (410). For example, the cursor controller 308 may be configured to provide a cursor that enables, e.g., the relevant client of the clients 120, 122, 124 to execute the lock request. Usage of the retrieved lock key and/or lock data value may generally correspond to the type of lock request being received. For example, some lock requests may be satisfied using only the lock key, such as when checking an existence of a relevant lock key. In such cases, as described herein, it may not be necessary or required to load the corresponding portion of the data array to the second cache line in order to execute the lock request. In other scenarios, of course, it may be necessary or desired to change a data value within the data array 140, in association with the lock request. For example, the lock request may require an addition or removal of a referenced owner or database transaction ID, or may specify or change a lock mode of the relevant lock, or otherwise add, remove, or alter a particular value stored within the relevant table entry of the data array 140.

Figure 5:
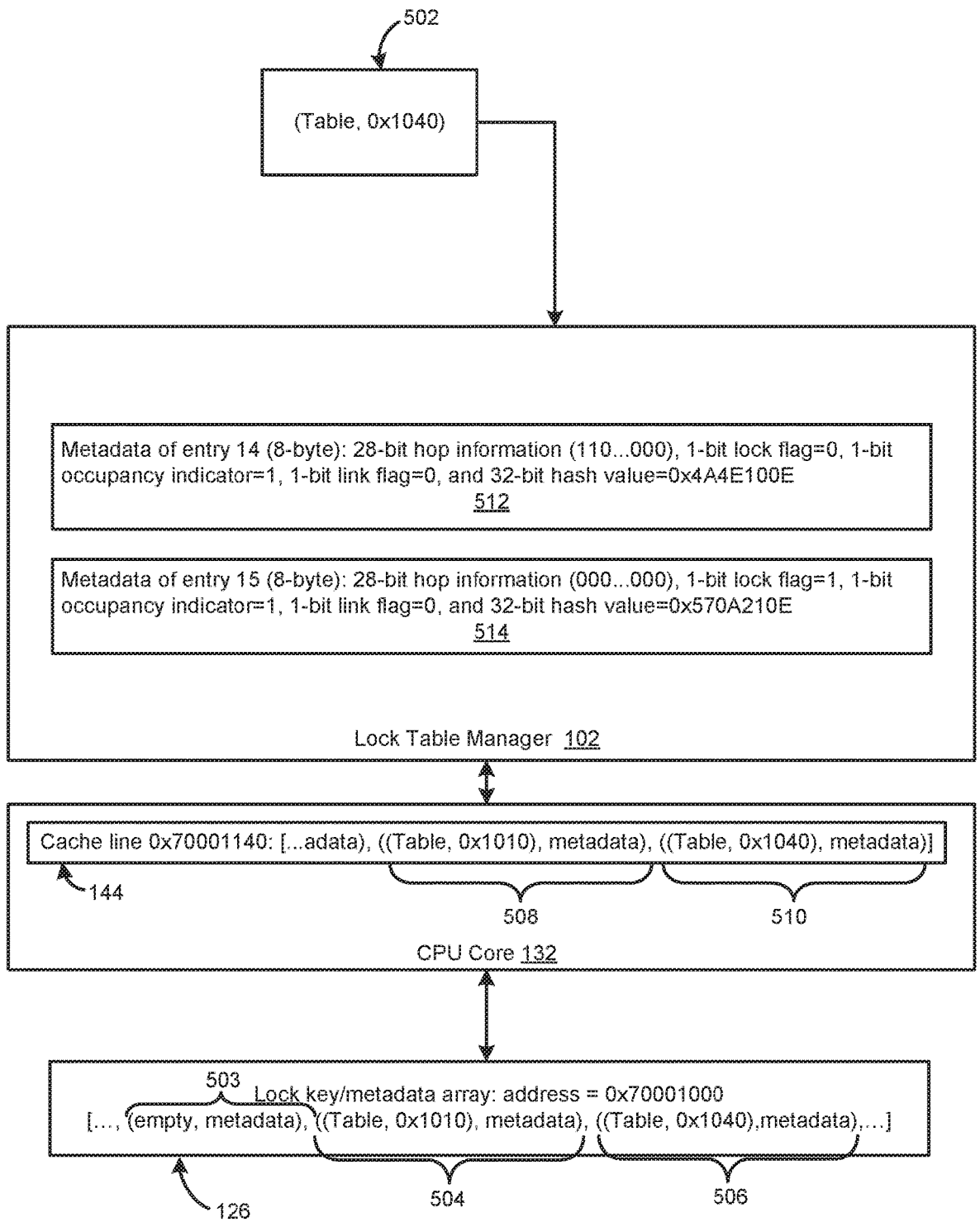
FIG. 5 is a block diagram illustrating a more detailed example implementation of the example of FIG. 3.

FIG. 5 is a block diagram illustrating a more detailed example implementation of the example of FIG. 3. As may be observed, the example of FIG. 5 corresponds in structure to the example of FIG. 3. In particular, the example of FIG. 5 includes an input 502 to the lock table manager 102, which causes the lock table manager 102 to load relevant portions of the lock table 134 from the memory 126 to the CPU core 132. As illustrated, FIG. 5 includes specific, non-limiting examples for the sake of explaining potential implementation scenarios, some of which are described below, with respect to FIGS. 6-8.

In particular, FIG. 5 illustrates that the input 502 may include a lock request corresponding to the table 0x1040, illustrated as being stored in the context of the entry 222 of FIG. 2, and corresponding to the row 206 having index value n=15. Meanwhile, the memory 126 is illustrated as storing associated lock key values, corresponding to the example of FIG. 2. For example, as shown, the memory 126 is illustrated as including an entry 503 corresponding to the lock key entry of the lock key array 138 within the row 202 having index value n=13. The memory also is illustrated as storing an entry 504 corresponding to the entry 214 of FIG. 2, referencing the table 0x1010 and associated metadata for the entry 214. Finally in the example of the memory 126 of FIG. 5, the entry 506 corresponds to the entry 222 of FIG. 2, including reference to the table 0x1040 and associated metadata of the entry 222 corresponding to the row 206 and the index value n=15.

In the example of FIG. 5, the cache line 144 is thus illustrated as being loaded with the corresponding entries 503, 504, and 506, or portions thereof. For example, as illustrated, an entry 508 corresponds to the entry 504, while an entry 510 corresponds to the entry 506.

Consequently, the lock table manager 102 may be configured to read the metadata of the entry 508, illustrated as metadata 512 corresponding to the entry for index value n=14. Similarly, the lock table manager 102 may thus be provided with access to the metadata of the entry 510, illustrated as metadata 514 corresponding to the entry having index value n=15.

As described in detail below, the metadata 512, 514 provides a number of useful features and functions. In the example, the metadata 512, 514 includes hop information used to implement hash collision resolution techniques, such as Hopscotch hashing. The metadata 512, 514 also includes various flags and indicators, such as may be used to indicate a presence or absence of a lock for a corresponding lock key, a presence or absence of certain types of content, and also the actual hash value calculated by the hash calculator 304 with respect to the lock key corresponding to the metadata in question.

Figure 6:
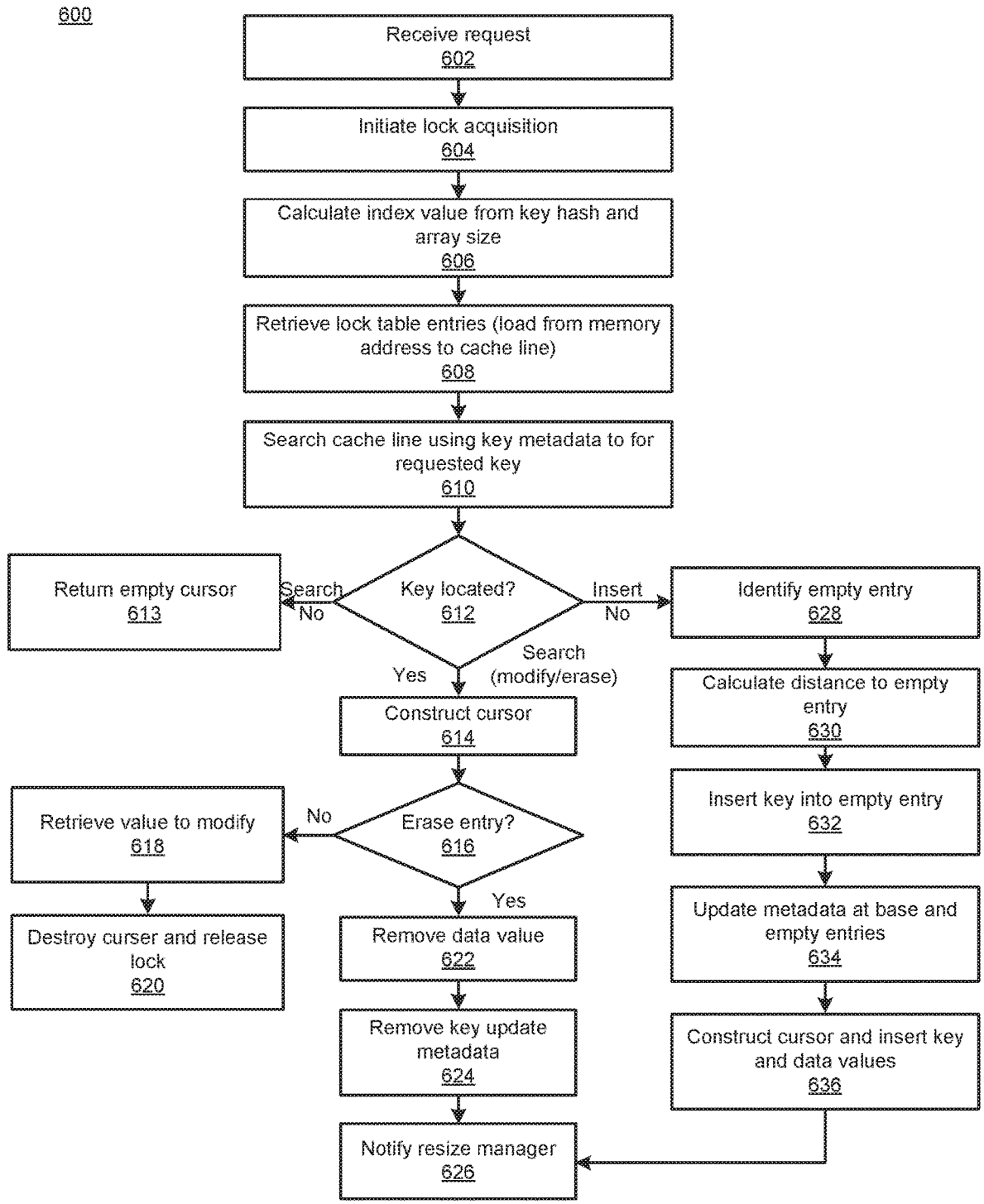
FIG. 6 is a flowchart illustrating example control flows for the lock table manager, with reference to the specific examples of FIGS. 2 and 5.

FIG. 6 is a flowchart 600 illustrating example control flows for the lock table manager 102, with reference to the specific examples of FIGS. 2 and 5. For example, FIG. 6 illustrates example scenarios in which lock table manager 102 is utilized to search for a lock key, execute a search/insert (emplace) operation, and/or erase a lock key, as well as associated operations for updating values of the lock table 134 in the context of the above and similar types of operations.

In the example of FIG. 6, a lock request is received (602). For example, in a search request, a particular database element may be specified. For example, as just described with respect to FIG. 5, the table 0x1040 may be specified within the input 502.

Although not specifically illustrated in the simplified example of FIG. 5, the search request input typically includes, or specifies, various lock parameters. For example, the input 502 may specify, or be associated with, a particular type of lock mode, e.g., shared. As described in detail below with respect to FIGS. 9-11, the lock mode may be relevant to operations of the resize manager 312 of FIG. 3. For example, a shared lock mode may block operations of the resize manager 312. More specifically, in the describe implementations such as those relating to the resize manager 312, search/erase/emplace operations operate in a shared mode (e.g., an RW-lock, as contrasted with the exclusive lock of operation 1016 in FIG. 10, described below) while reading pointers, in order to prevent the resize manager 312 from changing array pointers during the relevant time frame of the shared lock.

In FIG. 6, upon receipt of the lock request (602), the request handler 302 may proceed to initiate a lock acquisition process (604). For example, as just referenced, a shared lock (S-lock) may be acquired. Then, pointers and an array size(s) may be read, so that the resize manager 312 is not permitted to change the array pointer during this time. The S-lock may then be released. The request handler 302 may require the hash calculator 304 to assist in calculating an expected index value, such as by using a calculated hash value for the input 502, in conjunction with an overall array size of the lock table 134 (606). For example, for the table 0x1040, a hash value may be calculated of 0X570A210E, as illustrated in the 32-bit hash value of the metadata 514 in FIG. 5. If a relevant size of the array is =32, then a corresponding percentage of the array size would yield an index value of n=14. In the example, a hash ( ) function may be chosen in any appropriate manner. In the example, a default hash ( ) function of FNV-1a is used.

The cache loader 306 may proceed to retrieve the relevant lock table entries, including loading necessary lock table entries from a corresponding memory address to one or more corresponding cache lines (608). For example, in order to retrieve a lock table entry at index n=14, the memory address may be calculated using the known size of the lock key and lock key metadata. For example, if the lock key is 16 bytes, and the metadata is 8 bytes, then the total 24-byte data size may be used in conjunction with the calculated index value of n=14 to determine a relevant memory address within the memory 126. For example, the memory address may be calculated as (lock key/metadata array)+ 24*14=0x70001000+24*14, providing a memory address as 0X70001150. In other words, this approach provides a range of memory addresses that includes at least two contiguous lock key entries.

In the example, the CPU core 132 may then proceed to load 64-byte memory chunks into the cache line 144. As a result, the CPU core 132 loads memory address range including [0X700001140, . . . 0X700001180]. As illustrated in the example of FIG. 5 within the cache line 144, the result is that a portion of the entry 503 from within the memory 126 is loaded to the cache line 144, along with the entry 508 corresponding to the entry 504, and the entry 510 corresponding to the entry 506.

The requested lock key (i.e., the lock key corresponding to the input table 0x1040) may then be obtained from within the cache line 144, using the corresponding metadata 512, 514. In other words, as referenced above, even though the index value n=14 corresponds to the expected index value and associated array entry, as calculated by the relevant hashing algorithm, it may occur that the desired lock key is actually stored at a different index value within the array, due to previous implementation of hash collision resolution techniques.

Thus, in the example, the search is conducted for a lock table entry with a key for table 0x1040, and a hash value of 0X570A210E. The index in the example has been calculated as n=14, with an address 0X70001150. Upon examining the entry at the specified address, however, it is determined that the examined entry instead stores a different table, i.e., table 0x1010.

By looking at the metadata 512 for the calculated entry, the 28-bit hop information may be utilized to identify an actual location of the requested lock key entry. In the example of FIG. 5, the Hopscotch hashing technique is utilized for hash collision resolution, and the 28-bit hop information of the metadata 512 represents a list of entry indices in a fixed-size bit-vector form, in which each bit represents an offset from a value of the entry of the corresponding metadata (i.e., the entry n=14 in the example). In the example, the hop information is illustrated (110 . . . 000), in which the first bit represents index entry n=14, and the second bit indicates index entry n=15.

In this way, the entry at position n=15 is determined to include the desired lock key, so that the corresponding lock flag is marked within the metadata 514 in FIG. 5, and the value of the index n=15 is returned for subsequent operations of the example of FIG. 6. In some implementations, rather than comparing the lock keys to verify inclusion of the lock key within the entry specified by the hop information, the actual hash values included within the metadata may be compared. For example, comparing the hash values may provide a faster comparison operation than comparing the actual, underlying lock keys. If the lock flag of the identified metadata is already marked for locking, then it may be necessary to wait for the locked flag to be cleared before proceeding with subsequent operations.

In the example of FIG. 6, it will be appreciated that accessing the desired lock key only require the single CPU cache line 144, even though the desired lock key was not included within the calculated entry. Instead, because the structure of the lock table 134 enabled loading of adjacent lock keys to the cache line 144, and because the Hopscotch hashing algorithm of the example typically attempts to resolve hash collisions using adjacent or nearby memory addresses, the desired lock key is accessed using only a single cache read from the memory 126.

As a result of the above operations, the requested lock key may or may not be located (612). If the key cannot be located, and the received request was for a search operation, then an empty cursor may be returned (613). Otherwise, if requested, then various insert operations may be implemented, depending on the nature of the initial request, and as described below with respect to operation 628-636, and FIG. 8.

If the requested lock key is located (612), such as in the example provided above, then a requested operation may proceed, such as a modify or erase operation. For example, to proceed with one or more such operations, a corresponding cursor may be constructed (614). Continuing the example provided above, the cursor controller 308 may be configured to construct a cursor instance for the index value n=15.

If it is desired to modify retrieved values rather than erase a lock key entry (616), then the values to be modified may be retrieved (618). For example, a command cursor::getValue( ) may be implemented to return corresponding lock data value from the entry at n=15. For example, the transaction ID 25510 within the entry 224 of FIG. 2 may be changed or removed, or some other value of the entry 224 may be modified (as referenced above, even if the transaction ID 25510 is removed and the value for the "owners" field is empty within an entry 224, the relevant lock entry for the table 0x1040 may continue to be stored at the index value n=15, since current inclusion of the lock entry for the table 0x1040 may indicate a high likelihood of a future lock request with respect to the same table.

Once the desired modification has been completed, the cursor instance may be destroyed, and the corresponding lock may be released (620). For example, the lock flag within the metadata 514 may be reset from 1 to 0.

In contrast with the example just referenced, it may be desired to erase the entry at index value n=15 in its entirety (616). In other words, in this example, the previously-constructed valid cursor is used to remove a lock entry to which the cursor points. FIG. 7 provides an example in which the entry of the row 206 with index value n=15 of FIG. 2 is erased, so that the row 206 is empty, as illustrated in array entry 702 of the key array 138 and array entry 704 of the data array 140 of FIG. 7.

In order to proceed, any included data values of the entry being erased are removed (622), using the existing cursor. Then, the removal of the specified key entry, along with associated updates to any remaining metadata that may be required may proceed (624). For example, as described above, the metadata 512 of the entry n=14 includes the hop information described above of (110 . . . 0000), which was used to locate the lock entry at index value n=15 as including the table 0x1040. In the present example in which that lock key entry for the table 0x1040 is being erased from the entry at index value n=15, the hop information of the metadata 512 for entry 214 must also be updated to reflect this change.

Specifically, the second bit of the 28-bit hop information of the metadata 512 should be reset from a value of 1 to a value of 0, so that the hop information no longer refers to the entry at n=15. Further, as already described with respect to the illustration of FIG. 7, the actual key instance previously stored at the index value n=15 may be destroyed, leaving the entries 702, 704 empty. Accordingly, the metadata 514 for the entry n=15 may similarly be updated to reflect these changes. For example, the lock flag may be reset from the value of 1 to a value of 0, the occupancy indicator may be reset from the value of 1 to a value of 0, and the 32-bit hash value may be reset to 0, as well. The resize manager 312 may then be notified of the erasure of the entry (626), in case the erase operation triggers resizing operations of the resize manager 312. Specific examples of such resize operations, as referenced above, are provided below with respect to FIGS. 9-11.

Further in FIG. 6, if a requested lock key is not located (612), as referenced above, then insert operations, if requested, may proceed. For example, in a simplified example following the erase operations 622, 624 just described with respect to the entry at index value n=15, it may occur that the table 0x1040 is provided to be inserted within the lock table 134. Example results of such an insert operation are illustrated with respect to FIG. 8, in which an entry 802 is included within the lock key array 138 at the index value n=15, while an entry 804 is inserted at the corresponding location within the data array 140.

In order to proceed with the insert operation, the available empty entry must first be identified (628). In particular, operations 602-610 of FIG. 6 are essentially repeated for the example of FIG. 7 in which the entry 702, 704 are empty. In this case, with reference to FIG. 5, the corresponding memory address range 506 in the memory 126 (as well as the corresponding portion of the cache line 144 at entry 510), are empty. In other words, by way of example, the entry 506 within the memory 126 would simply appear to be the same as the entry 503 for the empty entry at value n=13, and would merely include an empty value field and associated metadata structure.

In order to identify the appropriate empty entry for the received table 0x1040, the hash calculator 304 may calculate the corresponding hash value to determine a default or base index value of n=14 corresponding thereto, as described above with respect to the operation 606. Upon loading the corresponding entry 504 from the memory 126 to the CPU cache line 144 as the entry 508, it is determined that the default or base entry is already full, and not available for use in the desired insert operation. Moreover, because the metadata 512, continuing the example described above with respect to FIG. 7, has hop information of (100 . . . 000), it is apparent that the lock key for the table 0X1040 has not been stored at another entry as a result of a hash collision resolution.

Consequently, to proceed with the resulting insert operation, a distance to a closest available empty entry may be calculated (630). In this case, searching from the calculated value of n=14, the empty entry at the index value n=15 is located, and determined to have a distance of 15−14=1 between the two entry locations.

Accordingly, the key may be inserted into the detected, empty entry (632), as illustrated in FIG. 8 by entries 802 and 804. Further, both the metadata 512 and the metadata 514 may be updated (634) to reflect results of the operations just described. For example, the hop information of the metadata 512 may be updated back to the value of (110 . . . 000) illustrated in the example of FIG. 5. Similarly, the metadata 514 is updated back to the values illustrated in the example of FIG. 5, because the lock flag is reset to 1, the occupancy indicator is also set to a value of 1, and the 32-bit hash value is reset from empty back to the calculated value of 0X570A210E.

In order to execute insertion of values for the entry corresponding to the table 0x1040 at the index value n=15, a cursor instance is constructed that points to the entry at the index value n=15, and the relevant lock key and data values are inserted (636). Upon the destruction of the cursor, the lock flag within the metadata 514 for the entry at index value n=15 is reset from a value of 1 to a value of 0, corresponding to a clearing of the lock for that entry.

As with the erase operation described above with respect to FIG. 7, the insert operation described with respect to FIG. 8 may have an impact on operations of the resize manager 312 (626). As referenced above, and described in detail below with respect to FIGS. 9-11, the resize manager 312 is generally configured to avoid scenarios in which the lock table 134 has either an excessive or insufficient number of empty entries.

In other words, for example, if the lock table 134 has a relatively large number of empty entries, then the lock table 134 may be considered to be using system resources inappropriately. On the other hand, if the lock table 134 has very few empty entries, then there may not be a sufficient number of empty entries to execute received lock requests.

Figure 9:
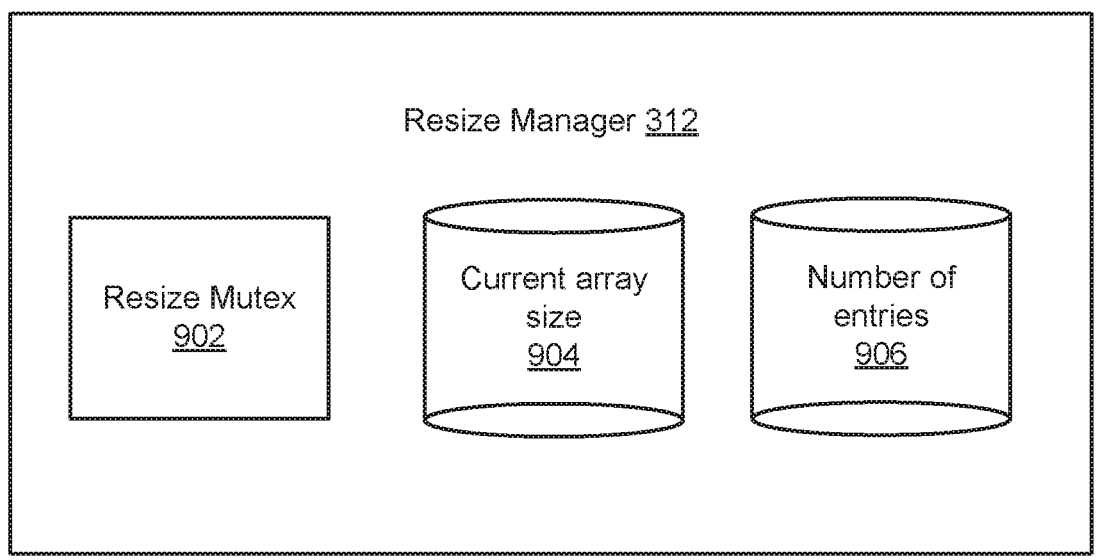
FIG. 9 illustrates a more detailed example implementation of the resize manager of FIG. 3.

FIG. 9 illustrates a more detailed example implementation of the resize manager 312 of FIG. 3. In the example of FIG. 9, the resize manager 312 is illustrated as including a resize mutex, which refers generally to a mutual exclusion program object that is configured to enable the types of resizing operations referenced above, and described and illustrated in detail below with respect to FIGS. 10 and 11.

As further illustrated in FIG. 9, the resize manager 312 may store a current array size 904, as well as a number of entries 906. In other words, a current array size 904 simply represents, for example, a total number of entries within the array of the lock table 134. For example, the array size of the lock table 134 in the preceding examples was described as being equal to a value of 32. Meanwhile, the number of entries 906 simply refers to the number of the entries within the array that are currently non-empty.

Figure 10:
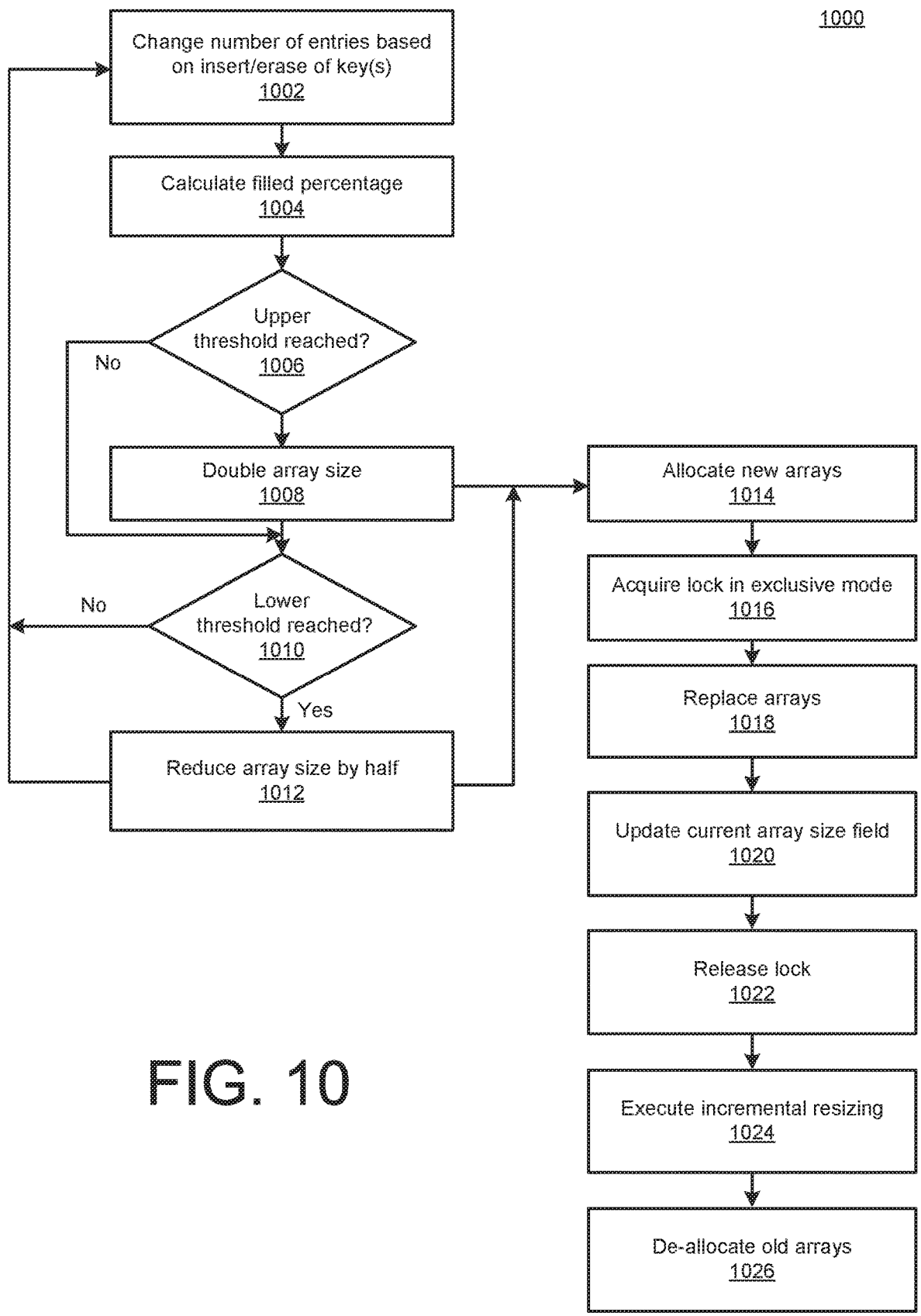
FIG. 10 is a flowchart illustrating example operations of the resize manager of FIG. 9.

FIG. 10 is a flowchart 1000 illustrating example operations of the resize manager 312 of FIG. 9. In particular, as a number of entries is changed based on the type of insert/erase operations described above with respect to FIG. 6 (1002), the filled percentage of the array may be calculated (1004). In other words, using the repositories 904, 906, the resize manager 312 may determine a proportion of the array that is currently empty or filled.

If the filled proportion reaches an upper threshold (1006), then the current array size 904 may be increased (e.g., may be doubled (1008)). If a given insert operation does not cause the upper threshold to be reached, then it may occur that an erase operation causes evaluation of the calculated filled percentage relative to a pre-established lower threshold (1010). Specifically, if the lower threshold is not reached, then FIG. 10 may simply proceed with changing the number of entries in response to a next-occurring insert/erase operation. On the other hand, if the lower threshold is reached (1010), then the array size may be reduced (e.g., may be reduced by half (1012)).

Thus, remaining operations 1014-1026 of FIG. 10 should be understood to represent operations of the resize mutex 902 of the resize manager 312, which may generally be implemented in conjunction with either the enlargement or reduction of the size of the array of the lock table 134.

Resize operations may be invoked internally, such as by emplace (search & insert) and erase operations. An emplace operation increments the number of entries field by 1 if a new key is inserted, while an erase operation decrements the number of entries field by 1. As referenced, during resizing, the array size may be doubled, or halved. To provide empirically-determined example threshold values, if (Number of Entries/Current Array Size) reaches 13/16 (from emplace operations) or reaches 3/16 (from erase operations), then resize operations may be triggered. The resize mutex 902 may be implemented so that only one CPU thread is allowed to resize the arrays, and if a thread is not successful in acquiring the mutex 902, resizing may be stopped or postponed.

Figure 11:
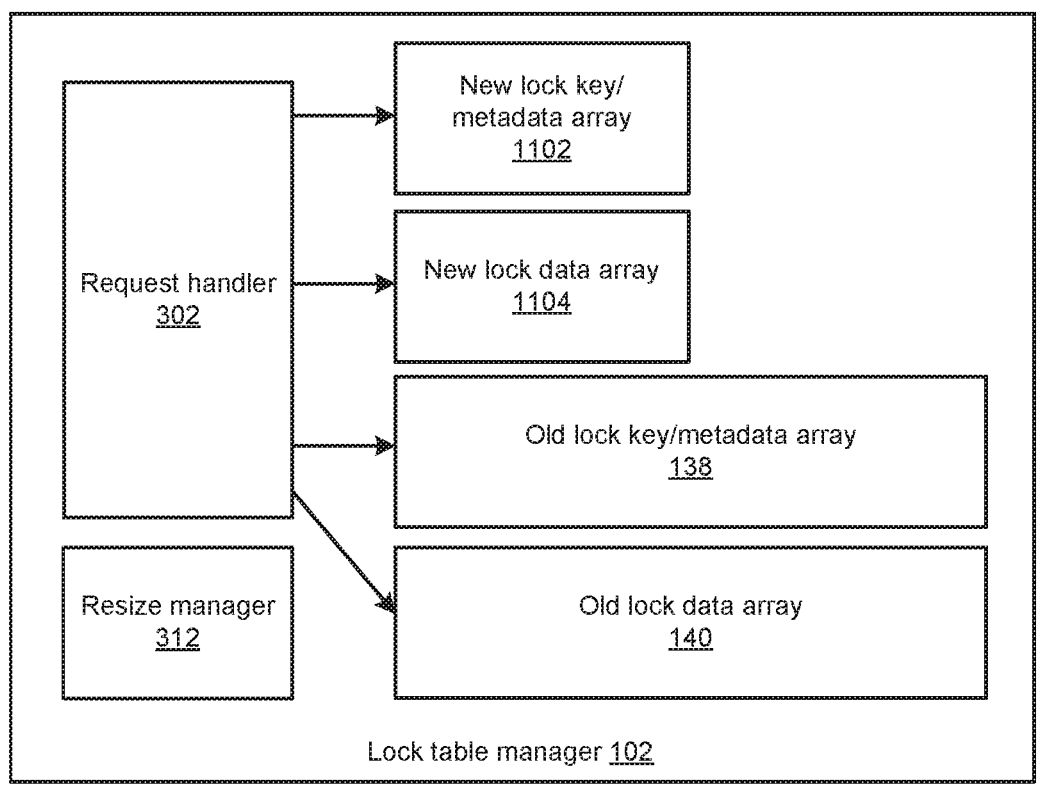
FIG. 11 is a block diagram illustrating a more detailed example implementation of the resize manager of FIG. 3.

To perform resizing, and with minimal blocking of other CPU threads (to conserve CPU power and time), new arrays may be allocated (1014), illustrated in FIG. 11 as new key array 1102 and new value array 1104. The requested lock may be acquired in EXCLUSIVE mode as an RW lock (1016), during which other requests are blocked. However, as described below, the time period during which other requests is blocked is very short.

As shown in FIG. 11, the new arrays 1102/1104 are included, while the old/previous arrays 138/140 are maintained. The current array size 904 is updated (1020), and the lock (e.g., RW lock) is released (1022). The request handler 302 may proceed with incremental resizing (1024), in which data from the old arrays 138/140 will be erased during normal usage operations, while any new data is stored using the new arrays 1102/1104. Eventually, when the old arrays 138/140 are empty, they may be de-allocated (1026). For example, on each access (search, emplace, erase) to the lock table manager 134, the relevant CPU thread moves a portion of old array entries to the new arrays 1102, 1104. During the incremental resizing, the lock table manager 102 searches the old arrays first when it attempting to locate an entry with a specific key (e.g., search, erase, emplace operations, or any operation that involves a key search). Put another way, inserting a new key into the old arrays 138, 140 is prohibited, as the old arrays 138, 140 are considered remove-only, and any new keys are inserted into the new arrays 1102, 1104.

The examples of FIGS. 9-11 may be used to postpone complete re-building of key-value pairs when the container of the lock table 134 is almost full or almost empty (as judged using predefined, empirically chosen threshold/load factors). An example enlarging procedure with specific commands and values may be implemented, e.g. by executing "Call HashMap::insert" for the lock table, and checking if the threshold/load factor has reached a value of $13/16$ (and proceeding if not). A 'resizing' flag may then be marked as true, which ensures that only a single thread executes the resize operation. In other words, if a thread finds that the resizing flag is already marked, then that thread does not perform the resizing operation.

Once the 'resizing' flag is marked, the new array size may be calculated, and corresponding memory may be allocated. At this point, in the example, only shared-lock for the stripe is acquired, so that other operations are not blocked. Once the memory is allocated and initialized, an exclusive lock for the stripe may be acquired, in order to replace current stripe with the new one. As described with respect to FIGS. 10 and 11, only simple memory operations on a relatively small number of pointers, along with stripe size information, are needed. Finally the 'resizing' flag may be unmarked, and the operations of FIGS. 10 and 11 for implementing incremental resizing may begin.

A similar procedure may be implemented when the size of a stripe reaches a point below the predefined load factor, such as $3/16$. For example, by executing "Call HashMap::remove," the load factor can be checked to verify whether the value of $3/16$ has been reached. If so, the resizing flag is marked true, and the process continues as just described above.

Figure 12:
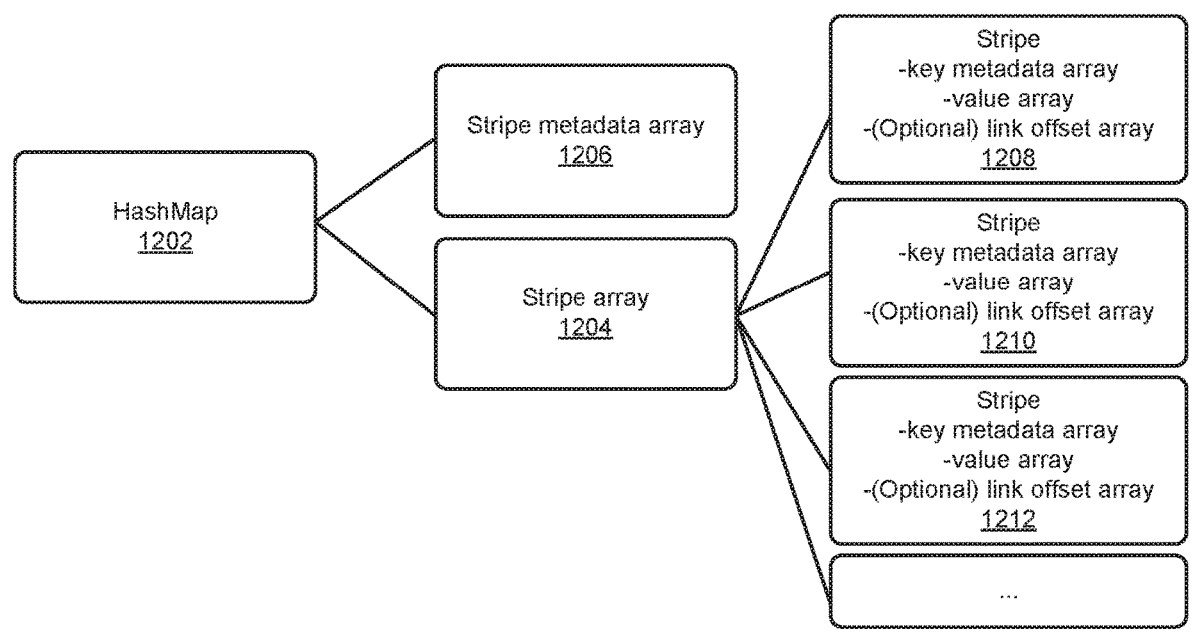
FIG. 12 is a block diagram illustrating an example implementation of the lock table of FIG. 1.

FIG. 12 is a block diagram illustrating an example implementation of the lock table 134 of FIG. 1. In the example of FIG. 12, the lock table 134 is implemented as a hashmap 1202, which includes a stripe array 1204 and a stripe metadata array 1206.

As shown, and as may be appreciated from the above description, each stripe 1208, 12010, 1212, . . . , of the stripe array 1204 in FIG. 12 represents an individual hash table that implements Hopscotch hashing. Each stripe has the type of (key, metadata) array and value array described above. Additionally in FIG. 12, a stripe may include a link offset array in order to deal with hop information overflow that may occur during Hopscotch hashing, as described below.

In FIG. 12, the hashmap 1202 includes a 2-level hash table that includes a fixed number of stripes that are independently resized. An initial size may be determined at instance construction time using a selected value that is adjusted to an adjacent power of 2.

A key is assigned to a stripe based on hash(key): stripeID(key)=(hash(key) & (number of stripes–1)), where the number of stripes is a power of 2 and the return value of hash(key) is an unsigned 64-bit integer. The array index to which the key is primarily assigned (i.e., primary location, also referred to herein as a base location) is dependent on the size of the stripe: primaryIndex(key)=((hash(key)>>32) & (size of stripe–1)). That is, in the examples, hash(key) is a 64-bit integer, while the key metadata stores only a 32-bit part of the 64-bit integer value, so that ((hash(key)>>32). In this way, the size of the metadata is 64-bit, as described, even while it stores other/additional information beyond hash(key). If the entry with primary index is already occupied by another key, Hopscotch hashing technique is used, e.g., with parameter H=28.

With respect to the stripe metadata array 1206, each stripe is associated with a 64-byte metadata that, in FIG. 12, is located in a different region of heap memory. Since the stripe array 1204 is accessed to locate an entry, cache invalidation may be avoided by locking a stripe. An entry of a stripe metadata may include the size of the stripe and a read-write lock for the stripe.

In the example of FIG. 12, and similarly to the examples provided above, every allocated key entry may be assigned 64-bit entry metadata that includes 28-bit hop information, 1-bit lock flag, 1-bit occupancy indicator, 1-bit link flag, and 32-bit hash value. The hop information may be implemented as a bit-map that indicates occupied neighborhood entries. The lock flag may be set if an entry is owned by a thread, at which point the entry cannot be accessed by other threads. The occupancy indicator indicates that an entry is occupied (i.e., a valid key is stored), if this flag is set.

As described below, a link flag may provide a backup mechanism along with Hopscotch hashing. For example, instead of resizing a stripe, hop information overflow (meaning, e.g., more than 28 keys have hash values that are assigned to the same stripe index) triggers a special entry linking mechanism.

As illustrated in FIGS. 3 and 5, a hash value for a key may be stored directly inside the entry metadata, e.g., to minimize the number of calls to the hash function. This value may also be used to search a key in the relevant container, since comparing two keys is usually more costly then comparing two 32-bit integers hash values. In such scenarios, direct key matching may only be implemented when the hash values match.

Each value array may reserve a heap memory of values. When a key-value pair is inserted into the hashmap 1202, an entry in a (key, metadata) array is locked, and the key and metadata are updated, then the value is copied into the associated entry in the value array.

The illustrated link offset array, as referenced above, may be utilized when a hash function functions undesirably. For example, each element in the link offset array may be implemented as a pair of 32-bit integers, in which the first integer indicates link head offset, and the second integer indicates next entry offset.

If a key insertion attempt fails during a hop full situation, and a vacant entry is found, a link offset array is allocated and assigned to the stripe. In this case, the relative index distance between the vacant entry and the key's primary entry (base entry) is written to the first integer of the primary entry's link offset array entry. The vacant entry then becomes the link head of the primary entry, and the link flag of the primary entry is set to true.

If another conflicting key attempt is made and another vacant entry is found, the vacant entry may be set to be the link head, e.g., by updating the primary entry's link offset array entry's first integer. Then, the original link head entry may be linked through the new link head by updating the new link head's link offset array entry's second integer to the relative distance between the original link head and the new one. Put another way, entry linking ensures successful insertion, as long as the container has a vacant entry, no matter how many time keys are conflicted.

In the example of FIG. 12, various commands/calls may be used, consistently with the examples provided above with respect to FIGS. 1-11. For example, "Cursor emplace(const KEY &, ARGS . . . )" may be used to insert a key value pair if the key is not found in the container, and will return a cursor that points to the entry with the key. If a VALUE type argument is given, a "move constructor" can be invoked. In related examples, while reserving a vacant entry in a stripe, shared-lock is acquired on the stripe, and as long as the returned cursor is alive, the entry is locked.

In another example, a command "Cursor insert(const KEY &, const VALUE &)" causes an insert of a key value pair if the key is not found in the container. A cursor is returned that points to the entry with the key, and a copy constructor is invoked.

For "bool erase(Cursor &)," entry to which the cursor points is erased. "True" is returned if the entry is removed from the container. The cursor becomes a reserved one, and a fill API may be called if a new value should be filled.

For "bool fill(Cursor &, ARGS . . . )," the corresponding value array entry may be constructed with given parameters and the entry may be marked as 'occupied,' if the given cursor is reserved. If the Cursor is a reserved one and has successfully constructed the value, a value of 'true' is returned.

For "bool remove(const KEY &)," an entry with the key may be erased. If the key is removed from the container, a value of 'true' may be returned.

For "Cursor get(const KEY &) noexcept," a cursor may be returned that points to the entry with the key. If the container does not store the key, an empty cursor may be returned.

For "bool peep(const KEY &, std::function<void(const KEY &, const VALUE &>) noexcept) noexcept," the given function may be called if the container stores the key. If the key is found and the function is called, then a value of "true" may be returned. For "void aggregate(const KEY &, std::function<void(const KEY &, const VALUE &>) noexcept) noexcept," the given function may be called for each entry in the container.

Thus, in the described examples, the lock table 134 (e.g., including the hashmap 1202 of FIG. 12) does not store a key and its corresponding value as a pair in a single memory chunk, but instead utilizes separate key and value arrays. Accordingly, more keys may fit into a single CPU cache line, and a cache miss ratio may be lowered while searching a key. Hopscotch hashing may be used to ensure hash-conflicting keys are located close to the base/primary location, at which the keys are expected to be located when the container is empty.

Furthermore, this technique is also extremely beneficial on non-uniform memory access (NUMA) systems. Atomic operation on a piece of data usually entails CPU cache line invalidation, and unrelated data access can be affected if the data resides in the same CPU cache line (known as "false-sharing"). Since many operations in the described examples, do not require a value(s) from a value array(s), CPU cache lines storing values from a value array may stay intact while the hashmap instance is being accessed.

Access to the described lock table/hashmap involves shared-locking on a target stripe, in order to prevent the stripe from being resized (e.g., since resize entails a moment of inconsistent state of the stripe). Implementations may offer memory transaction callback interfaces to eliminate the overhead from stripe locking, e.g., by making entry getters fit into a single memory transaction.

If a valid memory transaction callback is passed to a hashmap constructor, a lock acquisition code may be translated into lock state read code within the memory transaction boundary, expecting that the memory transaction implementation will trigger abort immediately when the lock state changes by resize operation. For example, this may occur as a default behavior in known Hardware Transactional Memory (HTM) systems). This technique may be applied not only to getter functions, but also to entry remove functions as well, since remove affects only one specific entry, as opposed to insert, emplace functions (which may access multiple entries to allocate an entry, so that memory transaction is often aborted in such scenarios).

If 32-bit arithmetic operations are performed faster than 64-bit operations for CPUs being used, the described lock table/hashmap may be configured to avoid 64-bit arithmetic operations, even if the max size of the hash table may exceed UINT32_MAX: UINT32_MAX*the number of stripes (max: UINT32_MAX). Furthermore, predefined numbers used in the lock table/hashmap implementations may be selected as powers of 2, to take advantage of compiler optimization (i.e., many entry index and size calculations may be implemented as shift operations, which are typically faster than arithmetic operations).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
   receive a lock request for a database element used in a database transaction, specified with respect to a lock table configured to selectively restrict database access to maintain database consistency;
   determine a lock table entry of the lock table for the lock request, the lock table entry stored in a memory and having an array index value, and including a lock key stored in a key array, and further including at least two lock data values stored in a data array;
   load a portion of the key array from the memory to a first cache line of a cache memory, including the lock key associated with the array index value and one or more additional lock key entries that are contiguous with the lock key entry associated with the array index value;
   execute the lock request, wherein executing the lock request includes:
      reading the first cache line of the cache memory;
      determining whether the lock key is stored at a first array index value based on reading the first cache line of the cache memory; and
      in response to determining that the lock key is stored at the first array index value based on reading the first cache line, executing the lock request using the lock key at the first array index value; or
      in response to determining that the lock key is not stored at the first array index value based on reading the first cache line:
         determining whether the lock key is stored at a lock key entry in the one or more additional lock key entries that are contiguous with the lock key entry associated with the array index value based on reading the first cache line of the cache memory; and
         executing the lock request using the lock key stored at the additional lock key entry in response to determining that the lock key is stored at an additional lock key entry in the one or more additional lock key entries.

2. The computer program product of claim 1, wherein the lock key is located within the first cache line using lock key metadata stored with the lock key that identifies the array index value.

3. The computer program product of claim 1, wherein the lock key is stored within the memory, and loaded to the first cache line, with key metadata that includes a hash value of the lock key.

4. The computer program product of claim 1, wherein the lock key is stored within the memory, and loaded to the first cache line, with key metadata that includes a lock flag indicating whether the database element is locked.

5. The computer program product of claim 1, wherein the key array is stored in a first column of the lock table, and the data array is stored as a second column of the lock table.

6. The computer program product of claim 1, wherein the instructions, when executed, are further configured to cause the at least one computing device to:
   determine that a size of the lock table has exceeded a load factor characterizing a proportion of the lock table that is filled; and
   resize the lock table.

7. The computer program product of claim 6, wherein the instructions, when executed, are further configured to cause the at least one computing device to resize the lock table including causing the at least one computing device to:
   allocate a new key array and a new data array having a new array size;
   read or erase existing lock table entries from the key array and data array when requested;
   write new lock table entries to the new key array and the new data array; and
   delete the key array and data array when empty.

8. The computer program product of claim 1, wherein the lock request includes at least one of: a request to change a lock status of the database element, a request to erase a lock data value, a request to erase a lock table entry, a request to insert a new lock table entry, and a request to insert a new lock data value.

9. A computer-implemented method, comprising:
   receiving a lock request for a database element used in a database transaction, specified with respect to a lock table configured to selectively restrict database access to maintain database consistency;
   determining a lock table entry of the lock table for the lock request, the lock table entry stored in a memory and having an array index value, and including a lock key stored in a key array, and further including at least two lock data value stored in a data array;

loading a portion of the key array from the memory to a first cache line of a cache memory, including the lock key associated with the array index value and one or more additional lock key entries that are contiguous with the lock key entry associated with the array index value;

executing the lock request, wherein executing the lock request includes:

reading the first cache line of the cache memory;

determining whether the lock key is stored at a first array index value based on reading the first cache line of the cache memory; and in response to determining that the lock key is stored at the first array index value based on reading the first cache line, executing the lock request using the lock key at the first array index value; or in response to determining that the lock key is not stored at the first array index value based on reading the first cache line:

determining whether the lock key is stored at a lock key entry in the one or more additional lock key entries that are contiguous with the lock key entry associated with the array index value based on reading the first cache line of the cache memory; and executing the lock request using the lock key stored at the additional lock key entry in response to determining that the lock key is stored at an additional lock key entry in the one or more additional lock key entries.

10. The method of claim 9, wherein the lock key is located within the first cache line using lock key metadata stored with the lock key that identifies the array index value.

11. The method of claim 9, wherein the lock key is stored within the memory, and loaded to the first cache line, with key metadata that includes a hash value of the lock key.

12. The method of claim 9, wherein the portion of the key array includes the lock key and at least a second lock key of a second lock table entry having a second array index value.

13. The method of claim 9, wherein the key array is stored in a first column of the lock table, and the data array is stored as a second column of the lock table.

14. The method of claim 9, further comprising:

determining that a size of the lock table has exceeded a load factor characterizing a proportion of the lock table that is filled; and resizing the lock table.

15. The method of claim 14, wherein resizing the lock table comprises:

allocating a new key array and a new data array having a new array size;

reading or erasing existing lock table entries from the key array and data array when requested;

writing new lock table entries to the new key array and the new data array; and deleting the key array and data array when empty.

16. The method of claim 9, wherein the lock request includes at least one of: a request to change a lock status of the database element, a request to erase a lock data value, a request to erase a lock table entry, a request to insert a new lock table entry, and a request to insert a new lock data value.

17. A system comprising:

one or more computer processors; and a memory storing instructions executed by the one or more computer processors to perform operations comprising:

receiving a lock request for a database element used in a database transaction, specified with respect to a lock table configured to selectively restrict database access to maintain database consistency;

determining a lock table entry of the lock table for the lock request, the lock table entry stored in a memory and having an array index value, and including a lock key stored in a key array, and further including at least two lock data value stored in a data array;

loading a portion of the key array from the memory to a first cache line of a cache memory, including the lock key associated with the array index value and one or more additional lock key entries that are contiguous with the lock key entry associated with the array index value;

executing the lock request, wherein executing the lock request includes:

reading the first cache line of the cache memory;

determining whether the lock key is stored at a first array index value based on reading the first cache line of the cache memory; and in response to determining that the lock key is stored at the first array index value based on reading the first cache line, executing the lock request using the lock key at the first array index value; or in response to determining that the lock key is not stored at the first array index value based on reading the first cache line:

determining whether the lock key is stored at a lock key entry in the one or more additional lock key entries that are contiguous with the lock key entry associated with the array index value based on reading the first cache line of the cache memory; and executing the lock request using the lock key stored at the additional lock key entry in response to determining that the lock key is stored at an additional lock key entry in the one or more additional lock key entries.

18. The system of claim 17, wherein the lock key is located within the first cache line using lock key metadata stored with the lock key that identifies the array index value.

19. The system of claim 17, wherein the lock key is stored within the memory, and loaded to the first cache line, with key metadata that includes a hash value of the lock key.

20. The system of claim 17, wherein the key array is stored in a first column of the lock table, and the data array is stored as a second column of the lock table.

* * * * *